United States Patent
Lonas, Jr.

(10) Patent No.: US 11,886,555 B2
(45) Date of Patent: Jan. 30, 2024

(54) ONLINE IDENTITY REPUTATION

(71) Applicant: Open Text Inc., Menlo Park, CA (US)

(72) Inventor: Hal Case Lonas, Jr., Carlsbad, CA (US)

(73) Assignee: OPEN TEXT INC., Menlo Park, CA (US)

( * ) Notice: Subject to any disclaimer, the term of this patent is extended or adjusted under 35 U.S.C. 154(b) by 236 days.

(21) Appl. No.: 16/910,046

(22) Filed: Jun. 23, 2020

(65) Prior Publication Data

US 2021/0009381 A1 Jan. 14, 2021

Related U.S. Application Data

(63) Continuation of application No. 15/266,984, filed on Sep. 15, 2016, now Pat. No. 10,735,401.

(51) Int. Cl.
*G06F 21/31* (2013.01)
*H04L 9/40* (2022.01)
(Continued)

(52) U.S. Cl.
CPC .......... *G06F 21/31* (2013.01); *B66B 7/02* (2013.01); *B66B 7/023* (2013.01); *B66B 7/025* (2013.01); *B66B 9/003* (2013.01); *G06F 21/32* (2013.01); *G06F 21/60* (2013.01); *G06F 21/604* (2013.01); *G06N 5/022* (2013.01); *G06N 20/00* (2019.01); *H04L 63/0823* (2013.01);
(Continued)

(58) Field of Classification Search
CPC .................. G06F 21/32; G06F 21/60
See application file for complete search history.

(56) References Cited

U.S. PATENT DOCUMENTS

| 7,647,375 B1* | 1/2010 | Fletcher | G06F 16/951 |
| | | | 709/204 |
| 7,720,835 B2* | 5/2010 | Ward | G06Q 30/02 |
| | | | 715/224 |

(Continued)

OTHER PUBLICATIONS

Zafarani, R. and Liu, H., Aug. 2013, Connecting users across social media sites: a behavioral-modeling approach. In Proceedings of the 19th ACM SIGKDD international conference on Knowledge discovery and data mining (pp. 41-49). (Year: 2013).*

(Continued)

*Primary Examiner* — James R Turchen
(74) *Attorney, Agent, or Firm* — Sprinkle IP Law Group

(57) ABSTRACT

Examples of the present disclosure describe systems and methods of determining online identity reputation. In aspects, an online identity of an entity may engage in online interactions. The content provided by the online identity may be accessed and analyzed to determine interaction characteristics and reputation metrics for the online identity. Based on the reputation metrics, the online identity and/or entity (and content therefrom) may be filtered from further online interactions. In some aspects, interaction data may be stored in a data store. An interaction mapping component having access to the data store may analyze the data store data to determine mappings between online identities, entities and interactions. In at least one aspect, an opt-in certificate system may also be provided. The opt-in system may provide an online identity or entity a certificate to securely validate identity.

24 Claims, 6 Drawing Sheets

(51) Int. Cl.
| | |
|---|---|
| *G06N 20/00* | (2019.01) |
| *G06F 21/60* | (2013.01) |
| *G06N 5/022* | (2023.01) |
| *B66B 7/02* | (2006.01) |
| *B66B 9/00* | (2006.01) |
| *G06F 21/32* | (2013.01) |
| *B66B 11/04* | (2006.01) |

(52) U.S. Cl.
CPC ... *B66B 11/0407* (2013.01); *G06F 2221/2135* (2013.01); *G06F 2221/2145* (2013.01)

(56) References Cited

U.S. PATENT DOCUMENTS

| | | | | |
|---|---|---|---|---|
| 8,484,730 | B1* | 7/2013 | P. R. | G06Q 30/02 709/225 |
| 8,984,098 | B1* | 3/2015 | Tomkins | G06F 16/487 709/219 |
| 9,141,628 | B1* | 9/2015 | Zimmermann | H04L 67/10 |
| 9,183,387 | B1* | 11/2015 | Altman | G06F 21/56 |
| 9,380,073 | B2* | 6/2016 | Zent | G06F 16/337 |
| 9,531,655 | B1* | 12/2016 | Buchheit | G06F 16/5838 |
| 10,735,401 | B2 | 8/2020 | Lonas | |
| 2009/0187988 | A1* | 7/2009 | Hulten | H04L 63/102 726/22 |
| 2011/0302103 | A1* | 12/2011 | Carmel | G06Q 10/10 705/347 |
| 2012/0209919 | A1* | 8/2012 | Shah | G06Q 30/0251 709/205 |
| 2013/0124644 | A1* | 5/2013 | Hunt | G06Q 50/01 709/206 |
| 2013/0227016 | A1* | 8/2013 | Risher | G06F 16/248 709/204 |
| 2014/0033307 | A1* | 1/2014 | Schmidtler | H04L 63/1483 726/22 |
| 2014/0090055 | A1* | 3/2014 | Palumbo | H04L 63/145 726/22 |
| 2014/0129217 | A1* | 5/2014 | Bapat | G10L 15/02 704/E15.001 |
| 2014/0208424 | A1* | 7/2014 | Hudack | H04L 63/1441 726/23 |
| 2014/0289867 | A1* | 9/2014 | Bukai | G06F 21/44 726/28 |
| 2014/0304343 | A1* | 10/2014 | Skiba | H04L 51/046 709/206 |
| 2014/0317736 | A1* | 10/2014 | Cao | H04L 63/1483 726/23 |
| 2015/0120583 | A1* | 4/2015 | Zarrella | G06F 16/906 705/317 |
| 2015/0188941 | A1* | 7/2015 | Boshmaf | H04L 63/1441 726/22 |
| 2015/0229666 | A1* | 8/2015 | Foster | H04L 65/403 726/22 |
| 2015/0293997 | A1* | 10/2015 | Smith | H04L 51/52 707/E17.014 |
| 2015/0310018 | A1* | 10/2015 | Fan | G06F 16/9535 707/734 |
| 2015/0341357 | A1* | 11/2015 | Rambur | H04L 63/10 726/3 |
| 2016/0117347 | A1* | 4/2016 | Nielsen | G06F 16/9024 707/738 |
| 2016/0294952 | A1* | 10/2016 | Bodell | H04L 51/046 |
| 2016/0306974 | A1* | 10/2016 | Turgeman | H04L 63/08 |
| 2016/0307191 | A1* | 10/2016 | Turgeman | G06F 21/316 |
| 2016/0307201 | A1* | 10/2016 | Turgeman | G06F 21/316 |
| 2017/0076225 | A1* | 3/2017 | Zhang | G06Q 10/063 |
| 2017/0155613 | A1* | 6/2017 | Ganci, Jr | H04L 67/306 |
| 2017/0169095 | A1* | 6/2017 | Antal | H04L 67/30 |
| 2017/0237696 | A1* | 8/2017 | Spurr | H04L 51/52 709/206 |
| 2017/0243120 | A1* | 8/2017 | Doan | G06F 40/30 |
| 2017/0243125 | A1* | 8/2017 | Thomas | G06N 7/01 |
| 2017/0308523 | A1* | 10/2017 | Wang | G06F 40/232 |
| 2017/0351961 | A1* | 12/2017 | Kochura | G06Q 50/01 |
| 2018/0018581 | A1* | 1/2018 | Cook | G06N 20/00 |
| 2018/0053114 | A1* | 2/2018 | Adjaoute | G06N 20/00 |
| 2020/0065814 | A1* | 2/2020 | Fang | G06Q 20/4014 |
| 2020/0285839 | A1* | 9/2020 | Donnenfeld | G06F 16/587 |
| 2021/0203651 | A1* | 7/2021 | Basson | G06F 21/556 |
| 2021/0279337 | A1* | 9/2021 | Mosby | G06N 20/00 |

OTHER PUBLICATIONS

Thomas, K., McCoy, D., Grier, C., Kolcz, A. and Paxson, V., 2013. {Trafficking} Fraudulent Accounts: The Role of the Underground Market in Twitter Spam and Abuse. In 22nd USENIX Security Symposium (USENIX Security 13) (pp. 195-210). (Year: 2013).*
Gao, H., Hu, J., Wilson, C., Li, Z., Chen, Y. and Zhao, B.Y., Nov. 2010, Detecting and characterizing social spam campaigns. In Proceedings of the 10th ACM SIGCOMM conference on Internet measurement (pp. 35-47). (Year: 2010).*
Li, Y., Martinez, O., Chen, X., Li, Y. and Hopcroft, J.E., Apr. 2016, In a world that counts: Clustering and detecting fake social engagement at scale. In Proceedings of the 25th International Conference on World Wide Web (pp. 111-120). (Year: 2016).*
Subrahmanian, V.S., Azaria, A., Durst, S., Kagan, V., Galstyan, A., Lerman, K., Zhu, L., Ferrara, E., Flammini, A. and Menczer, F., 2016. The DARPA Twitter bot challenge. Computer, 49(6), pp. 38-46. (Year: 2016).*
Villar-Rodriguez, E., Ser, J.D. and Salcedo-Sanz, S., 2015. On a machine learning approach for the detection of impersonation attacks in social networks. In Intelligent Distributed Computing VIII (pp. 259-268). Springer, Cham. (Year: 2015).*
Xiao, C., Freeman, D.M. and Hwa, T., Oct. 2015, Detecting clusters of fake accounts in online social networks. In Proceedings of the 8th ACM Workshop on Artificial Intelligence and Security (pp. 91-101). (Year: 2015).*
Hummer, M., Kunz, M., Netter, M et al. Adaptive identity and access management-contextual data based policies. Eurasip J. on Info. Security 2016, 19 (2016). https://doi.org/10.1186/s13635-016-0043-2; Published: Aug. 15, 2016 (Year: 2016).*
Office Action for U.S. Appl. No. 15/266,984, dated Aug. 24, 2018, 10 pgs.
V.S. Subrahmanian, et al., "The DARPA Twitter bot challenge," arXiv preprint arXiv:1601.05140. 2016, 17 pgs.
Steven E. Stemler, "Content analysis, Emerging Trends in the Social and Behavioral Sciences," John Wiley & Sons, Inc., 2015, pp. 1-14.
Alex Hai Wang, Jun. 2010, "Detecting spam bots in online social networking sites: a machine learning approach", IFIP International Federation for Information Processing, Data and Applications Security Xxiv, Lncs 6166, Springer, Berlin, Heidelberg, 2010, pp. 335-342.
Office Action for U.S. Appl. No. 15/266,984, dated Feb. 4, 2019, 11 pgs.
Abdulrahman Alfarifi, et al., 2016. "Twitter turing test: Identifying social machines," Information Sciences, 372, 2016, pp. 332-346.
Yazan Boshmaf, et al., "Integro: Leveraging Victim Prediction for Robust Fake Account Detection in OSNs." In NDSS, vol. 15, Feb. 8-11, 2015, San Diego, CA, pp. 8-11.
Adele L. Jia, et al., "Estimating user interaction strength in online networks," Delft University of Technology, Parallel and Distributed Systems Report Series, Report No. PDS-2013-007, Feb. 2013, 27 pgs.
Dinh Nguyen Tran, et al. "Sybil-Resilient Online Content Rating," NSDI, vol. 9, No. 1, 2009, pp. 15-28.
Emilio Ferrara et al., "The rise of social bots," Communications of the ACM, vol. 59, No. 7, Jul. 2016, pp. 96-104.
Clayton A. Davis et al., "Botornot: A system to evaluate social bots," In Proceedings of the 25th International Conference Companion on World Wide Web, Montreal, Canada, Apr. 2016, pp. 273-274.
Arash Molavi Kakhki et al., "Iolaus: Securing online content rating systems," In Proceedings of the 22nd international conference on World Wide Web, Rio de Janeiro, Brazil, May 13-17, 2013, pp. 919-930.

(56) References Cited

OTHER PUBLICATIONS

Gang Wang et al., "You Are How You Click: Clickstream Analysis for Sybil Detection," Proceedings of the $22^{nd}$ USENIX Security Symposium, Washington, DC, vol. 9, Aug. 14-16, 2013, pp. 241-255.

John P. Dickerson et al., Using sentiment to detect bots on twitter: Are humans more opinionated than bots?, In Proceedings of the 2014 IEEE/ACM International Conference on Advances in Social Networks Analysis and Mining, 2014, pp. 620-627.

Office Action for U.S. Appl. No. 15/266,984, dated Sep. 3, 2019, 11 pgs.

\* cited by examiner

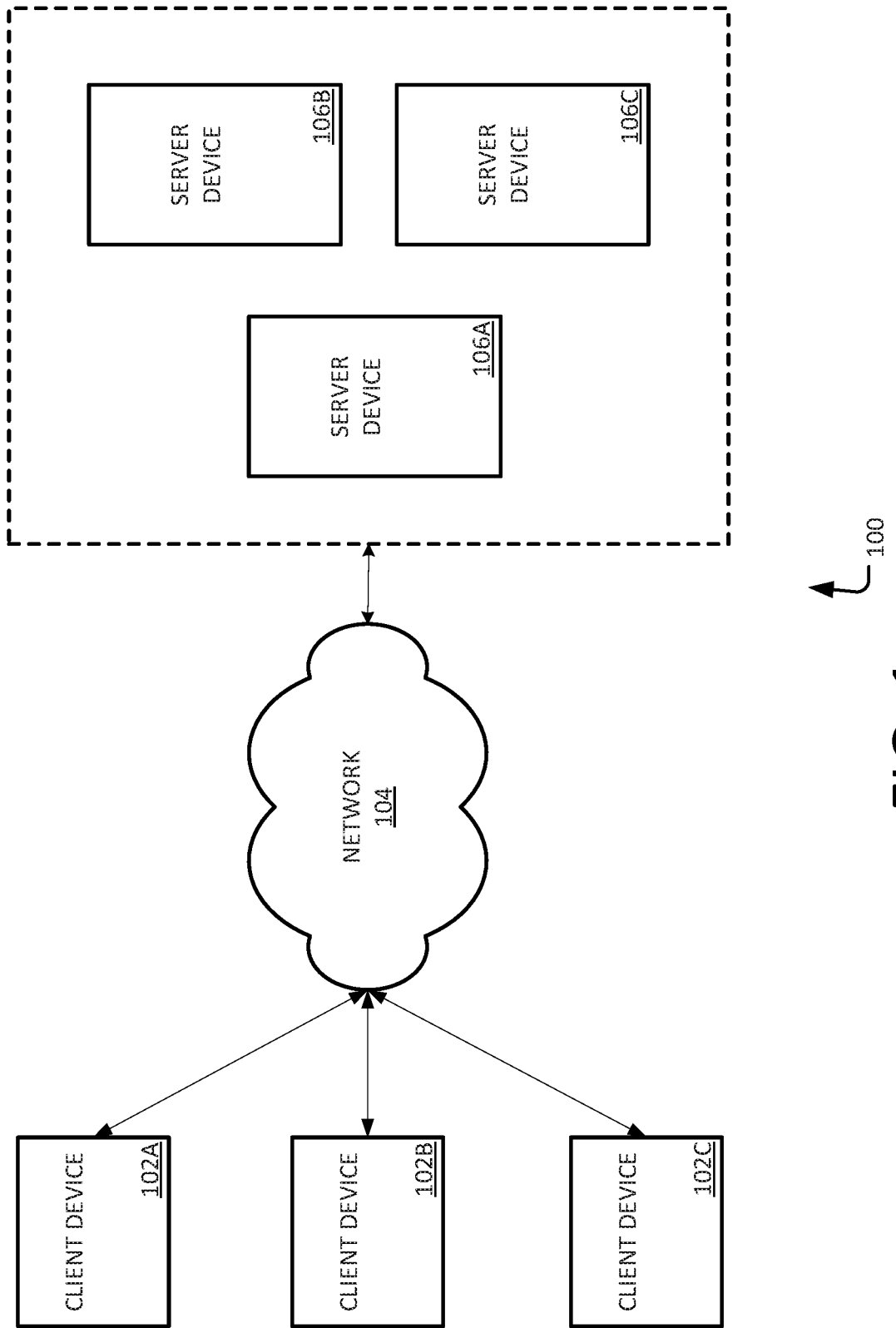

ONLINE IDENTITY REPUTATION

CROSS-REFERENCE TO RELATED APPLICATION

This application is a continuation of, and claims a benefit of priority under 35 U.S.C. 120 of the filing date of U.S. patent application Ser. No. 15/266,984 filed Sep. 15, 2016, issued as U.S. Pat. No. 10,735,401, entitled "ONLINE IDENTITY REPUTATION", the entire contents of all of which are hereby expressly incorporated by reference for all purposes.

BACKGROUND

Many of the online interactions that occur today involve conversations between one or more entities. Often times, both of the entities are real people with legitimate interests. However, in some instances, the entities are artificial personas, such as advertising bots, machine-created chat bots and people misrepresenting their identities. These artificial personas may be designed to solicit sensitive personal information (e.g., passwords, financial data, etc.) for the purpose of identity theft, nuisance activities (e.g., public releases of private data, data tampering, etc.), and/or other criminal activities. Accordingly, it is desirable to ensure entities—whether real or machine personas—are reputable and trustworthy prior to/while conducting online interactions.

It is with respect to these and other general considerations that the aspects disclosed herein have been made. Also, although relatively specific problems may be discussed, it should be understood that the examples should not be limited to solving the specific problems identified in the background or elsewhere in this disclosure.

SUMMARY

Examples of the present disclosure describe systems and methods of determining online identity reputation. In aspects, an online identity of an entity may engage in online interactions. The content provided by the online identity may be accessed and analyzed to determine interaction characteristics of the content and a reputation metric for the online identity and/or entity. Based at least on the reputation metric, the online identity and/or entity (and content therefrom) may be filtered from further online interactions. In some aspects, interaction data for an online identity may be stored in a data store. The data store may comprise online interaction data, access and authentication data, identity mapping/processing rules, reputation metrics, and/or mappings between online identities, entities and interactions. An interaction mapping component having access to the data store may analyze the data store data to determine mappings between online identities, entities and interactions. In at least one aspect, an opt-in certificate system may be provided. The opt-in system may provide an online identity or entity a certificate to securely validate identity.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Additional aspects, features, and/or advantages of examples will be set forth in part in the description which follows and, in part, will be apparent from the description, or may be learned by practice of the disclosure.

BRIEF DESCRIPTION OF THE DRAWINGS

Non-limiting and non-exhaustive examples are described with reference to the following figures.

FIG. 1 illustrates an overview of an example system for determining online identity reputation as described herein.

DETAILED DESCRIPTION

Figure 2A:
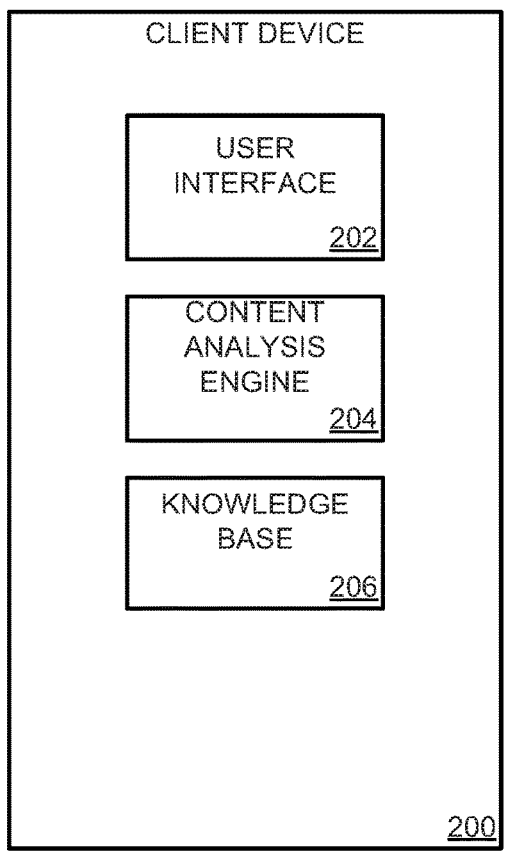
FIGS. 2A and 2B illustrate diagrams of a client device and server device, respectively, for determining online identity reputation as described herein.

Various aspects of the disclosure are described more fully below with reference to the accompanying drawings, which form a part hereof, and which show specific exemplary aspects. However, different aspects of the disclosure may be implemented in many different forms and should not be construed as limited to the aspects set forth herein; rather, these aspects are provided so that this disclosure will be thorough and complete, and will fully convey the scope of the aspects to those skilled in the art. Aspects may be practiced as methods, systems or devices. Accordingly, aspects may take the form of a hardware implementation, an entirely software implementation or an implementation combining software and hardware aspects. The following detailed description is, therefore, not to be taken in a limiting sense.

The present disclosure describes systems and methods of determining online identity reputation. The described systems and method measure the trustworthiness and/or reputation of different interactions between entities, and represent the measurement as a score or value. In examples, such a score/value may indicate the relative security risk of conducting an interaction. Such security risks may include, for example, fraud, harassment, identity theft, loss of financial and/or reputation value, etc.

In aspects, an entity (e.g., a user, a group, an organization, etc.) may be associated with one or more online identities (e.g., user name, internet or group persona, etc.). The entity may use one or more online identities to generate and navigate content and/or engage in online interactions (e.g., tweets, blogs, tagged photos, instant messages, Facebook posts, Pinterest pins, emails, media consumption, etc.). In at least one example, the entity may interact with the same users, services or webpages using various online identities associated with the entity. The content generated by the interactions of the online identity may be analyzed to determine interaction characteristics. Interaction characteristics, as used herein, may refer to content attributes (e.g., style, diction, tone, voice, length, intent, etc.), interaction attributes (e.g., client and/or client device information, interaction forum, interaction type, etc.), dialogue attributes (e.g., length of dialogue, location of content within a dialogue, number of participants in the dialogue, dialogue topic and consistency, etc.), behavioral attributes (e.g., user interests and/or opinions, access methods/times, etc.), demographic information (e.g., age, gender, education, profession, income level, relationship status, etc.), environmental factors (e.g., geolocation, acoustic qualities of venue, background noise, etc.), etc. In some aspects, the interaction characteristics may be determined by parsing the content and interactions in real-time (e.g., as the content is received) and/or evaluating identity profile data of an online identity. The parsed data may be provided as input to one or more statistical models. A model, as used herein, may refer to a statistical language model that may be used to determine a probability distribution over one or more word and/or character sequences and/or to predict a response value from one or more predictors. In examples, a model may be a rule-based model, a machine-trained regressor, a machine-trained classifier, or the like. The statistical models may determine a set of characteristics for the content and use the set of characteristics to generate one or more feature vectors or feature sets. A feature vector, as used herein, may refer to an n-dimensional vector of numerical features that represent one or more objects.

In aspects, the feature vectors or feature sets may be provided to one or more predictive models. The predictive models may use the feature vectors/sets to generate a reputation metric that is used to indicate the perceived trustworthiness of content, an interaction, an online identity and/or an entity. The reputation metric may comprise or be represented by one or more values, scores, terms, reports and/or images. The reputation metric may correspond to (or be associated with) information such as reviews (e.g., online reviews, word of mouth, etc.), associations (e.g., subscribers, followers, viewership, affiliated entities, etc.), page rank (e.g., an algorithm to rank websites and/or the rankings thereof), search engine optimization (SEO) data (e.g., website traffic, load time, session data, bookmarks, backlinks, etc.), social media activity (e.g., size of user base, quality/expertise of users, use of interactive content, etc.), and the like. In some examples, the reputation metric may be presented to a user and used to determine whether the online identity and/or entity (and content therefrom) should be filtered from further online interactions. In at least one example, reputation metrics may alternately or additionally be used to establish policies or set thresholds for a policy-based access control system.

In some aspects, interaction data (e.g., content, interaction characteristics, etc.) may be stored in a data store. The data store may comprise (or have access to) online interaction data, access and authentication data, session data, identity mapping/processing rules, reputation metrics, and/or mappings between online identities, entities and interactions. In examples, the mappings may be created using pattern matching techniques, one or more rule sets, fuzzy logic, machine-learned classifier and/or one or more weighting algorithms. For example, a machine-learned classifier may have access to a plurality of online identities (e.g., user names, aliases, etc.) in the data store. Based on a semantic similarity between two or more of the online identities, the machine-learned classifier may determine that the two or more of the online identities correspond to the same entity. As another example, fuzzy logic may be applied to a set of interaction data for one or more online identities in the data store. The fuzzy logic may use at least content styles and client device geolocation to determine that a plurality of online identities correspond to the same entity. In some aspects, the data store may be populated using data from a client device, a server device, a network appliance and/or other data repositories accessible to the data store.

In at least one aspect, an opt-in certificate system may be provided. The opt-in certificate system may be operable to receive a digital certificate requests from online identities and/or entities attempting to certify themselves as reputable and trustworthy. A digital certificate, as used herein, may refer to a cryptographic electronic document used to allow entities to exchange information securely over a network connection. In examples, upon receiving a digital certificate request, the opt-in certificate system may determine whether to issue a digital certificate to the requesting entity. The determination may include the analysis of interaction data associated with the requesting entity and/or data solicited from the requesting entity. If a digital certificate is issued to an entity, a copy of the digital certificate may be stored by the opt-in certificate system and/or forwarded to one or more other devices. In some aspects, when an entity attempts to establish a connection with another entity, the opt-in certificate system may validate that one or more of the entities possesses a valid, enforceable digital certificate.

Accordingly, the present disclosure provides a plurality of technical benefits including but not limited to: dynamic online interaction analysis; aggregation and correlation of user contextual data; generation/presentation of online reputation scores; creation of policy-based controls; population of an online data store comprising interaction data; mapping of online identities to entities; aggregation of interaction data from network appliances; increased accuracy of identifying online identities/entities; training predictive models; an opt-in certificate system; digital certificate maintenance and distribution; increased security for online interactions; reduced malware exposure and, thus, processing speed and CPU utilization; and improved efficiency and quality for applications/services utilizing examples of the present disclosure, among other examples.

FIG. 1 illustrates an overview of an example system for determining online identity reputation as described herein. Exemplary system 100 presented is a combination of interdependent components that interact to form an integrated whole for automatic inline detection systems. Components of the systems may be hardware components or software implemented on and/or executed by hardware components of the systems. In examples, system 100 may include any of hardware components (e.g., used to execute/run operating system (OS)), and software components (e.g., applications, application programming interfaces (APIs), modules, virtual machines, runtime libraries, etc.) running on hardware. In one example, an exemplary system 100 may provide an environment for software components to run, obey a constraints set for operating, and utilize resources or facilities of the system 100, where components may be software (e.g., application, program, module, etc.) running on one or more processing devices. For instance, software (e.g., applications, operational instructions, modules, etc.) may be run on a processing device such as a computer, mobile device (e.g., smartphone/phone, tablet, laptop, personal digital assistant (PDA), etc.) and/or any other electronic devices. As an example of a processing device operating environment, refer to the exemplary operating environments depicted in FIG. 6. In other examples, the components of systems disclosed herein may be spread across multiple devices. For instance, input may be entered on a client device and information may be processed or accessed from other devices in a network, such as one or more server devices.

As one example, the system 100 comprises client devices 102A-C, distributed network 104, a distributed server environment comprising server device 106A-B, and a network device environment comprising network devices 108A-B. One skilled in the art will appreciate that the scale of systems such as system 100 may vary and may include more or fewer components than those described in FIG. 1. In some examples, interfacing between components of the system 100 may occur remotely, for example, where components of system 100 may be spread across one or more devices of a distributed network.

In aspects, client devices 102A-C may be configured to receive, generate and/or interact with user-generated content. Exemplary content may include voice, visual, touch and text data. For example, client devices 102A-C may provide access to an application for generating, posting, navigating and/or analyzing content. Client devices 102A-C may extract and/or analyze the content using one or more analysis components and/or data sources accessible to client devices 102A-C. Exemplary analysis components may include data parsing engines, natural language processing machine learning mechanisms (e.g., a support vector machine (SVM), a restricted Boltzmann machine, a decision tree, etc.), real-time event detection systems, etc. Exemplary data sources may include web servers, content providers, client devices, databases, user records/profiles, event logs, authentication data, application data, etc. Client devices 102A-C may use the analyzed data to determine interaction characteristics associated with the content. The interaction characteristics may be transmitted to a set of web services for determining reputation metrics for content, online identities and/or entities. The reputation metrics may comprise scores/values related to a degree of trustworthiness, a determination of trustworthiness, or other statistics related to the reputation of an online identity/entity. In examples, client devices 102A-C may present the reputation metrics to a user/entity via the user interface component. In other examples, client devices 102A-C may use the reputation metrics to set or modify security policies or security policy-based controls associated with accessing content or interacting with entities. In some aspects, client devices 102A-C may be different device types and/or may each be associated with an online identified corresponding to an entity. For example, an entity (e.g., a user) associated with online identities A-C may access a media website using online identity A on client device 102A (e.g., a mobile phone), online identity B on client device 102B (e.g., a tablet), and online identity C on client device 102C (e.g., a laptop computer). In another example, an entity (e.g., an organization) may access a social media website where entity member A uses online identity A on client device 102A (e.g., a mobile phone), entity member B uses online identity A on client device 102B (e.g., a mobile phone), and entity members C and D use online identity A on client device 102C (e.g., a PC).

In aspects, server devices 106A-C may be configured to receive and process interaction characteristics from client devices 102A-C. For example, server devices 106A-C may comprise or have access to a set of web services for determining reputation scores. The set of web services may facilitate the analysis of interaction characteristics received from a client device. The analysis may include identifying individual interaction characteristics and generating corresponding reputation metrics and/or scores. Server devices 106A-C may then transmit the reputation metrics/scores to the client device via distributed network 104. Server devices 106A-C may be further configured to store received interaction characteristics in a data store. In examples, the data store may comprise online interaction data, device/user access data, authentication data, session data, browsing data, online identity profile data, entity profile data, mapping/processing rules, reputation metrics, and/or mappings between online identities, entities and interactions. Additionally, or alternately, the data store may have access to one or more data sources comprising such information. For example, the data store may have access to one or more web servers, content providers, client devices, network appliances, databases, user records/profiles, event logs, authentication data, application data, etc.

Server devices 106A-C may be further configured to identify/establish relationships between one or more online identities/entities and a set of interaction characteristics. For example, server devices 106A-C may be associated with a mapping component. The mapping component may access the data store to analyze interaction data. The analysis may include, for instance, using fuzzy logic to match online identities/user names, comparing the styles of posted content for various online identities/entities, comparing device names/addresses, etc. Based on the analysis, one or more online identities may be linked or mapped to one or more entities. An indication of the mapping may be added to the data store and/or used to train the mapping component to identify/establish relationships in the interaction data.

Server devices 106A-C may be further configured to provide and/or validate digital certificates. For example, server devices 106A-C may be associated with a certificate system. The certificate system may enable online identities and/or entities to self-certify as reputable and trustworthy. In examples, the self-certification process may include a certificate request by an online identity/entity. In response to the certificate request, the certificate system may request identifying information about the requesting entity and/or an identification of each online identity associated with the requesting entity. The certificate system may verify and/or record the information provided by the requesting entity prior to determining whether to issue the entity a digital certificate. When the certificate system determines to issue a digital certificate to an entity, the certificate system may store a copy of the digital certificate. In some aspects, the certificate system may be invoked when an online identity/entity engages in online interactions with another device. For example, an entity may attempt to establish a connection to a social media website. As part of the authentication process, the connection request of the entity (or a device associated with the entity) may be transmitted to the certificate system. The certificate system may search a local digital certificate storage space to verify that the entity has been issued a digital certificate. If the certificate system is able to verify the digital certificate, the certificate system may facilitate the entity's connection to the social media website. If the certificate system is not able to verify the digital certificate, the certificate system may prevent the entity from accessing or posting content on the social media website.

Figure 2B:
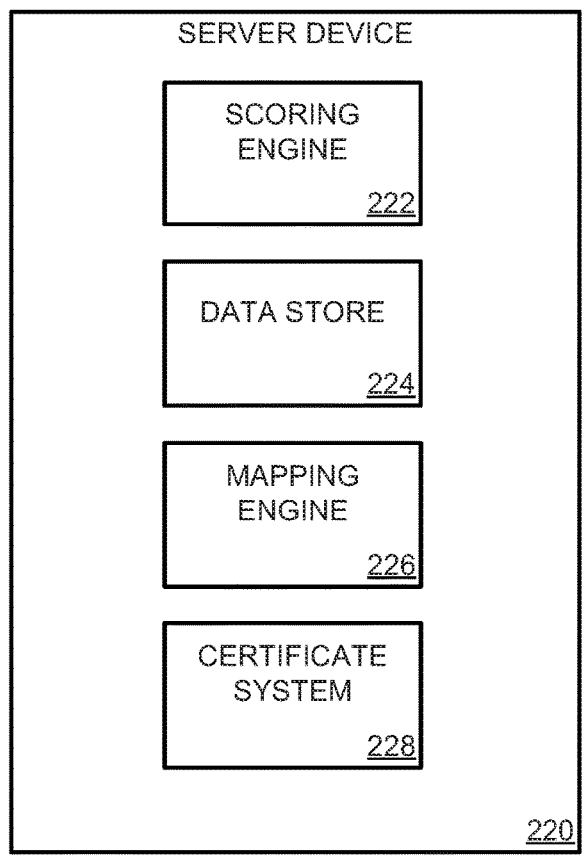

FIGS. 2A and 2B illustrate an overview of an exemplary client computing device 200 and server device 220 for determining online identity reputation, as described herein. The real-time online identity reputation techniques implemented by client computing device 200 and server device 220 may comprise the real-time online identity reputation and content described in FIG. 1. In alternative examples, a single system (comprising one or more components such as processor and/or memory) may perform processing described in systems 100, 200 and 220, respectively. Further, server device 220 may comprise a user interface component as described in the description of FIG. 1.

With respect to FIG. 2A, client device 200 may comprise user interface 202, content analysis engine 204 and knowledge base 206. User interface 202 may be configured to receive, generate and/or interact with user-generated content from an online identity or an entity. In aspects, user interface 202 may receive instructions to engage in one or more online interactions (e.g., compose a tweet, add to a blog, pin a photo, navigate a message board, reply to a message, etc.). The instruction may be associated with the creation or navigation of content and may invoke content analysis engine 204. Content analysis engine 204 may be configured to access created, viewed and/or navigated content. In aspects, content analysis engine 204 may receive or have access to any content generated or viewed by an online identity/entity. Content analysis engine 204 may parse and process the content to determine content characteristics and/or interaction characteristics associated with the content. In examples, determining such characteristics may include an analysis of attributes associated with the content, the interaction, a dialogue comprising the content (or a portion thereof), entity behavior, entity demographics, environmental factors, etc. In some aspects, content analysis engine 204 may additionally or alternately have access to a knowledge base, such as knowledge base 206.

Knowledge base 206 may be configured to comprise (or otherwise have access to) online interaction data, device/user access data, authentication data, session data, browsing data, online identity profile data, entity profile data and/or reputation metrics. In examples, knowledge base 206 may be a data repository or an application/service for identifying and aggregating data. Content analysis engine 204 may use the data from knowledge base 206 to determine content/interaction characteristics or modify content/interaction characteristics determined by content analysis engine 204. For example, content analysis engine 204 may use content navigated on a social media website by an online identity to produce a feature vector or feature set. Content analysis engine 204 may then access knowledge base 206 to identify additional data associated with the online identity. Based on the additional data from knowledge base 206, content analysis engine 204 may update (e.g., add or modify features for) the feature vector/feature set. Client device 200 may transmit the feature vector/feature set and/or information associated with the interaction/online identity to server device 220 via an interface or listening service.

Content analysis engine 204 may further be configured to process reputation metrics. In aspects, client device 200 may receive reputation metrics from a web service or application accessible to server device 220. The reputation metrics may be received in response to transmitting a feature vector or feature set to server device 220, as described above. In examples, content analysis engine 204 may process the reputation metrics to identify or generate reputation determinations for one or more online interactions, identities and/or entities. The processing may include parsing the reputation metrics using pattern matching techniques and/or providing parsed data to a reputation modeling component. In a particular example, the reputation modeling component may use the parsed data as input to provide a reputation determination. For instance, based on identifying a reputation value of '90' in the received reputation metrics, the reputation modeling component may provide a reputation ranking of 'trustworthy' to an entity. In some aspects, content analysis engine 204 may perform actions based on or using one or more of the reputation metrics and the reputation determinations. For example, based on a reputation determination of 'untrustworthy' for an online identity, content analysis engine 204 may filter content posted by the online identity, block communications to the online identity and/or hide user data (e.g., profile data, online status, etc.) from the online identity. As another example, content analysis engine 204 may use the reputation metrics to establish/modify a policy-based content control system. For instance, content analysis engine 204 may identify a reputation score and one or more undesirable web pages associated with an online identity. Based on the identified information, content analysis engine 204 may set a policy scheme that blocks access to any data source identified by the undesirable web pages and/or having a reputation score equal to or below the identified reputation score. In yet another example, content analysis engine 204 may use the reputation metrics and the reputation determinations as input. The input may be used to train content analysis engine 204 to more accurately determine content characteristics and/or interaction characteristics associated with the content.

With respect to FIG. 2B, server device 220 may comprise scoring engine 222, data store 224, mapping engine 226 and certificate system 228. Scoring engine 222 may be configured to identify/generate reputation metrics for content, an online identity and/or an entity. Scoring engine 222 may be or comprise (or otherwise have access to) a predictive model, such as a support vector machine (SVM), a Bayesian classifier, a neural network, a generalized linear model, a decision tree-based classifier, etc. In aspects, server device 220 may receive client data (e.g., online identity, device IP, etc.) and/or one or more feature vectors/feature sets from, for example, client device 200. Scoring engine 222 may access the feature vectors/sets and use one or more scoring algorithms to process and provide metrics for the feature vectors/sets. The metrics may correspond to a reputation, an identity or the trustworthiness of an online identity or entity. The metrics may comprise or be represented by one or more values, scores, terms, reports and/or images. Additionally, the metrics may vary in type and/or value depending on, for example, the type of online interaction, the social network accessed, etc. In examples, the metrics may be provided to client device 200 and/or stored in a data store, such as data store 224. Data store 224 may be configured to access, observe and/or store data, such as feature vectors/feature sets, reputation metrics, client access data, authentication data, session data, browsing data, profile data. For example, data store 224 may receive and store feature data and metrics from scoring engine 222. In another example, data store 224 may have access to one or more services or applications for identifying and/or aggregating user events associated with content processed by scoring engine 222.

Mapping engine 226 may be configured to identity and map online interaction data, online identities and/or entities. Mapping engine 226 may be or comprise (or otherwise have access to) a predictive model, such as a support vector machine (SVM), a Bayesian classifier, a neural network, a generalized linear model, a decision tree-based classifier, etc. In aspects, mapping engine 226 may have access to one or more data sources, such as data store 224. Mapping engine 226 may process the data (or portions thereof) to create one or more links or mappings. Processing the data may comprise parsing and grouping the data, analyzing the parsed/grouped data to identify correlations between interactions, content, online identities and/or entities, and mapping the identified correlations. In examples, mapping engine 226 may use processing techniques including fuzzy logic to match online identities/user names, comparisons of content styles and attributes, comparisons of device names/addresses, etc. For instance, mapping engine 226 may use fuzzy logic to determine that the two identities JohnnyDoe_xx0425xx and JDoe425 correspond to the entity (e.g., user) John Doe. As a result, mapping engine 226 may link the two identities to each other and to the entity John Doe. In some aspects, the mapped data may be stored in data store 224, transmitted to client device 200 or made otherwise available to one or more services/devices. The mapped data my then be used to inform decisions related to the reputation and trustworthiness of an entity and/or any associated online identities.

Certificate system 228 may be configured to provide and/or validate digital certificates. In aspects, certificate system 228 may comprise an interface for receiving digital certificate requests from online identities and/or entities attempting to certify themselves as reputable and trustworthy. The interface may enable a user to provide identifying information, such as entity data (e.g., entity name, address, affiliations, photos, etc.), online identity data (e.g., associated entity, associated identities, profile usage/affiliations, etc.), security data (e.g., passwords, public/private keys, etc.), device data (e.g., device names/addresses, whitelist of approved devices, etc.), content samples, etc. In examples, certificate system 228 may use at least one or more portions of the identifying information to generate or assign a digital certificate. A digital certificate may prove ownership of a cryptographic implement (e.g., a public/private key, a password, etc.) or represent a validation that an online identity/entity is reputable, trustworthy, and/or accurately representing their identity. A digital certificate may comprise information about the identity of an entity, a digital signature of an authority that has verified the digital certificate's content, information related to a public/private key, etc. In at least one example, a digital certificate may comprise or be subject to expiration criteria, such as expiring after a predefined duration or in response to a reputation-altering event. For instance, an entity that was previously issued a digital certificate may have that digital certificate revoked or suspended in response to inconsistent, fraudulent or malicious entity activity. After a digital certificate has been generated/assigned, digital certificate 228 may transmit the digital certificate to the requesting online identity/entity. Certificate system 228 may also store a copy of the digital certificate and/or forward the digital certificate (or a copy thereof) to one or more other devices.

Certificate system 228 may be further configured to validate digital certificates. In aspects, after certificate system 228 issues a digital certificate to an entity, certificate system 228 may be invoked when the entity attempts to engage in online interactions. For example, an entity having a digital certificate issued by certificate system 228 may attempt to interact with (e.g., post content to, navigate, etc.) a social media website. Certificate system 228 may access and analyze the entity's digital certificate to determine whether the entity has permission to interact with the website. Analyzing a digital certificate may include comparing one or more portions of the entity's digital certificate to one or more portions of a local copy of the digital certificate. The analysis may additionally or alternately include providing the digital certificate to a certificate verification agent/service. In examples, if certificate system 228 determines that the entity has permission to interact with the website (e.g., a digital certificate is validated), certificate system 228 may facilitate a connection to the requested device/service (e.g., by authenticating an entity, configuring a session, loading a profile, etc.). If, on the other hand, certificate system 228 determines that the entity does not have permission to interact with the website, certificate system 228 may block the interaction and/or report the attempted interaction to one or more entities (such as a social media website, a regulatory entity, scoring engine 222, etc.).

Having described various systems that may be employed by the aspects disclosed herein, this disclosure will now describe various methods that may be performed by various aspects of the disclosure. In aspects, methods 300-500 may be executed by an exemplary system such as system 100 of FIG. 1. In examples, methods 300-500 may be executed on a device comprising at least one processor configured to store and execute operations, programs or instructions. However, methods 300-500 is not limited to such examples. In other examples, methods 300-500 may be performed on an application or service for providing automatic inline detection. In at least one example, methods 300-500 may be executed (e.g., computer-implemented operations) by one or more components of a distributed network, such as a web service/distributed network service (e.g. cloud service).

Figure 3:
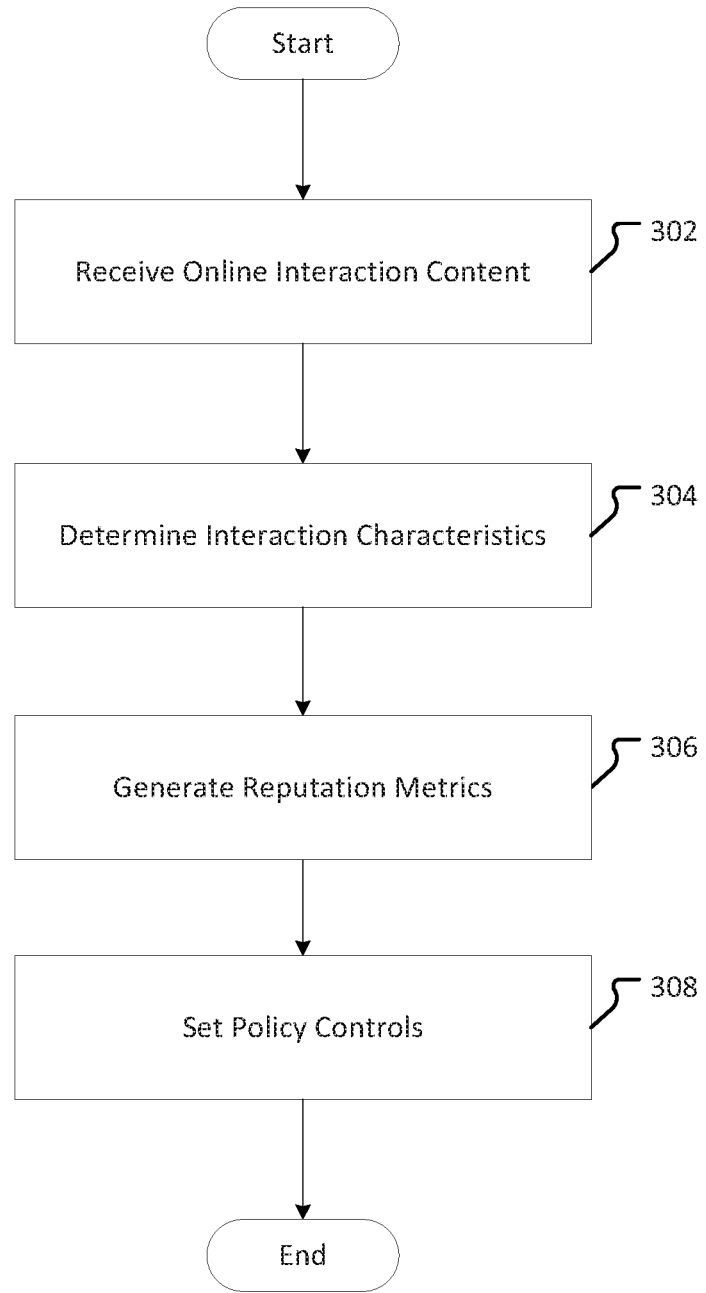
FIG. 3 illustrates an example method of determining online identity reputation as described herein.

FIG. 3 illustrates an example method 300 of determining online identity reputation as described herein. Exemplary method 300 begins at operation 302 where content may be received and identified by a computing device, such as client device 200 of FIG. 2. In aspects, the computing device may comprise an interface, such as interface 202, for receiving and navigating content generated during one or more online interactions. The interface may be configured such that the received/navigated content is recorded and/or extracted for processing/analysis. For example, a user using the online identity JDoe425 may access a social media website comprising posted content from one or more users. In response to the user navigating (e.g., reading, viewing an image, etc.) one or more portions of the posted content, an interface (or component associated with the interface) that is interfacing with the social media website may record the navigated content. In examples, navigated content may be identified by user feedback signals, such as screen swipes, clicks, scrolls, cursor movement, dwell time, session duration, query (re)formulation statistics, element visibility, occlusion events, device type/capabilities, etc.). For instance, the content viewed by a user of a touch-based mobile device during a user session may be determined by analyzing the number of down swipes, the portion of visible content in each viewport (e.g., a stable view of the visible portion of a display area), and the amount of time spent on each viewport. In a particular example, the analysis may be performed using a rule set or machine learning model. For instance, as a user navigates content, an interface may capture and provide feedback signals as input to a machine learning model. The machine learning model may analyze the feedback signals and output an indication of the content read by the user or of interest to the user.

At operation 304, content may be analyzed to determine interaction characteristics. In aspects, navigated content (as determined in operation 302) may be accessible to an analysis component, such as content analysis engine 204. The analysis component may analyze the navigated content to identify/determine content characteristics for the content. For example, the analysis component may determine that the content is associated with a particular writing style, diction, tone and user intent. The analysis component may also determine that the content is part of a larger dialogue, one or more topics in the dialogue, and the context of the content with respect to the dialogue. In some aspects, the analysis component may additionally or alternately analyze the navigated content to identify/determine interaction characteristics for the content/online interaction. In such aspects, the analysis component may have access to a knowledge base, such as knowledge base 206, comprising information related to the online identity/entity, the user session, and/or an online interaction. For example, the analysis component may access user data (e.g., user profiles, account information, etc.) to determine an online identity's behavioral attributes (e.g., user interests and/or opinions, content access methods/times, purchase history, complimentary actions/behaviors, etc.), demographic attributes (e.g., age, gender, education, profession, income level, relationship status, etc.), environmental attributes (e.g., geolocation, acoustic qualities of venue, background noise, etc.).

In aspects, the analysis component may correlate one or more portions of the content characteristics and interaction characteristics to generate a feature set or feature vector corresponding to the online interaction/content. For instance, the analysis component may analyze a social media post of a user to determine that (stylistically) the post is laced with aggression and neuroticism. The analysis component may access a social media profile and GPS data to further determine that the user that authored the post is a 30-year-old male that typically accesses the social media website from Starbucks between the hours of 11:30 AM and 12:30 PM on Mondays and Wednesdays. Further still, the analysis component may access a purchase history of the user and sensor data on the client device used to author the post to determine that Starbucks averages 96 decibels between 11:30 AM and 12:30 PM, and the user typically purchases a caramel latte. Based on these analyses, the analysis component may generate (or cause to be generated) a feature vector (or feature set) associated with one or more portions of the analyzed data. As another example, the analysis component may analyze a social media post of a user to determine that the content of the post is laced with terminology indicating aggression and neuroticism.

At operation 306, reputation metrics may be generated for an online identity/entity. In aspects, the computing device may make the feature vectors/sets generated in operation 304 accessible to a reputation scoring component, such as scoring engine 222. For example, the computing device may provide the feature vectors of an online interaction to a set of web services for determining a reputation score of an online identity/entity. The set of web services may be associated with the computing device or with a server device, such as server device 220. The set of web services may apply one or more scoring algorithms associated with the reputation scoring component to the feature vectors/sets to generate or modify a set of reputation metrics. In examples, generating the set of reputation metrics may include parsing the feature vectors/sets, accessing one or more data sources (e.g., web servers, content providers, client devices, databases, user records/profiles, event logs, etc.) associated with the online identity/entity, and/or comparing the parsed data to the data/events in the data sources. For instance, a feature vector may indicate that the online identity Flowers_92 is a 24-year-old female that has an interest in hot yoga and only accesses Facebook from her mobile phone. The set of web services may access a social media profile of Flowers_92 comprising several yoga-related posts and an event log for devices used by Flowers_92 comprising device information and application access data. The set of web services may search the yoga-related posts for references to "hot yoga" and compare the device name in the feature vector to a devices profile for Flowers_92.

In some aspects, if the data in the feature vectors/sets is successfully matched to the data source data searched/compared by the reputation scoring component, the reputation scoring component may provide one or more reputation metrics for the feature vectors/sets. For example, continuing from the exemplary feature vector for Flowers_92, if the set of web services identifies posts comprising "hot yoga" and determines that the device identified in the feature vector is a mobile phone, the set of web services may assign Flowers_92 a reputation score indicating trustworthiness (e.g., $95/100$) or modify a preexisting reputation score for Flowers_92 accordingly (e.g., towards the reputation score 95). As another example, if the set of web services identifies posts comprising "yoga" but not "hot yoga," and determines that the device identified in the feature vector is a mobile phone, the set of web services may assign Flowers_92 a reputation score indicating partial trustworthiness (e.g., $75/100$). As yet another example, if the set of web services identifies posts comprising "yoga" but not "hot yoga," and determines that the device identified in the feature vector is not a mobile phone, the set of web services may assign Flowers_92 a reputation score indicating distrust (e.g., less than $50/100$) and/or a label of "untrusted." In such examples, the set of web services may modify a preexisting reputation score proportionately to the magnitude between the dynamically generated reputation score and the preexisting reputation score. Alternately, the set of web services may modify a preexisting reputation score to be equal to the dynamically generated reputation score.

At operation 308, reputation scores may be used to set policy controls. In aspects, the computing device may have access to the reputation metrics generated in operation 304. The computing device may identify or determine a reputation for an online identity/entity using the reputation metrics. In examples, determining a reputation may include the use of pattern matching techniques, a rule set, a machine learning classifier, or the like. For instance, the computing device may parse the reputation metrics to identify one or more reputation values for an online identity/entity. The computing device may then apply a rule set to the reputation metrics that identifies a reputation value of 80-100 as trustworthy, 60-79 as partially trustworthy, 40-59 as untrusted and 0-39 as a known bad actor. A label (e.g., "trustworthy," "partially trustworthy," etc.) associated with an identified reputation value may then be assigned to the online identity/entity. In aspects, the computing device may present the reputation value and/or the reputation label to online identities and/or entities interacting with Flowers_92 or content generated by Flowers_92. In another example, the computing device may provide reputation metrics comprising a reputation score, the label "undecided" and imagery data (e.g., a profile image, an icon of the entity, an emoticon, etc.) to a machine learning classifier. The machine learning classifier may analyze one or more portions of the reputation metrics and make one or more inferences to generate a reputation for the entity. For instance, the machine learning classifier may provisionally assign the reputation score '90' as trustworthy and the label "undecided" as untrustworthy. The machine learning classifier may then compare the imagery data (e.g., a profile image) to known and/or labeled images of the entity. In examples, comparing the data may comprise the use of one or more images matching techniques, such as keypoint matching, scale-invariant feature transform (SIFT), speeded up robust feature (SURF), etc. If a match or partial match is indicated for the compared imagery/images, the machine learning classifier may provisionally assign the imagery data as "partially trustworthy." Based on the provisional assignments (e.g., "trustworthy," "untrustworthy" and "partially trustworthy") and/or one or more weighting factors (e.g., weighting algorithms, reputation metrics ranking, etc.), the machine learning classifier may then determine a reputation for an entity.

In some aspects, the computing device may use the reputation metrics and/or reputation determination data to filter content, online identities and/or entities. For example, the computing device may comprise a set of policy controls establishing a set of boundaries for the online interactions of one or more entities. The set of policy controls may be set or modified manually using an interface, such as user interface 202, or automatically by one or more components of the computing device. For instance, the computing device may access a reputation metric for the online identity Flowers_92. The reputation metric may comprise the reputation value '85' and an associated reputation label of "trustworthy." Based on this information, the computing device may set a policy indicating that Flowers_92 is trustworthy, and a policy that establishes a reputation value of '85' and above as trustworthy. As another example, the computing device may access a reputation metric for the online identity Angry_Starbucks_Guy. The reputation metric may comprise the reputation value '95,' an associated reputation label of "trustworthy," and an "R-rated" icon. In this example, the "R-rated" icon may represent that the entity's content comprises strong language, adult topics, an aggressive posture, or other mature elements. Based on this information, the computing device may set a policy that filters/blocks content by Angry_Starbucks_Guy, despite a reputation value of 95 and a trustworthy reputation. In such an example, the computing system may use an exceptions system to prioritize or flag one or more reputation metrics such that the presence of a metric (e.g., "R-rated icon") overrides a standard rule set (such as, allow online transactions when a reputation value is at least 80). In some aspects, the computing device may apply the policy uniformly to the each of the online identities associated with an entity. In other aspects, the computing device may apply the policy selectively to one or more online identities based on a set of permissions or exceptions. For example, an entity may be associated with four online identities, one of which corresponds to a primary account and three of which correspond to sub-accounts. A policy to restrict access to a particular website (or category of websites) may be determined for the entity. As a result, the policy may be automatically applied to the online identities of the three sub accounts. The online identity of the primary account, however, may be provided with an option to override or modify the policy.

Figure 4:
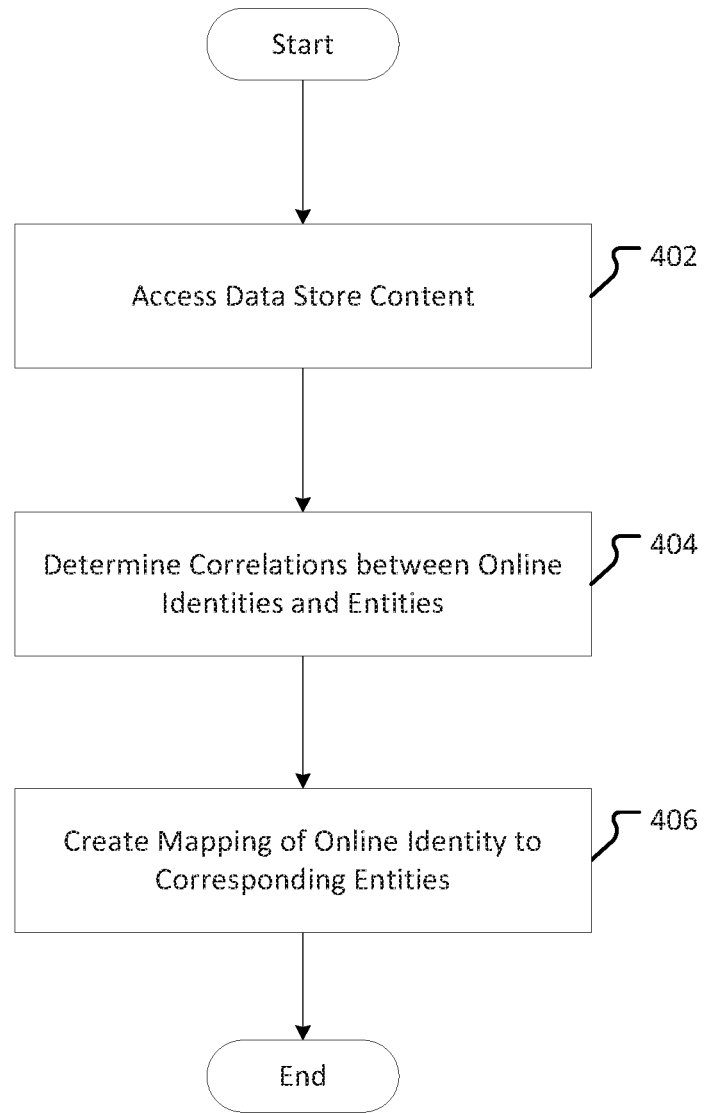
FIG. 4 illustrates an example method of mapping online identities as described herein.

FIG. 4 illustrates an example method of mapping online identities as described herein. Exemplary method 400 begins at operation 402 where a data store, such as data store 224, may be accessed by a computing device, such as client device 200 and/or server device 220. In aspects, the computing device may comprise the data store (or instance thereof) or have access to one or more portions of the data store. The data store may comprise (or have access to) online interaction data, device/user access data, authentication data, session data, browsing data, online identity profile data, entity profile data, reputation metrics, and/or mappings between online identities, entities and interactions. The data store data may be populated by the computing device using data received from an interface (such as user interface 202), data accessed from a data source (such as knowledge base 206), data generated during the reputation scoring process from analysis components (such as content analysis engine 204 and scoring engine 222), and/or data received from other network devices (such as network appliances in the computing devices' network). In some examples, the computing device may access the data store directly. For instance, the computing device may use an interface to execute queries against and receive query results from the data store. In other examples, the computing device may access the data store indirectly. For instance, the computing device may submit a search request to the data store via a data processing/searching utility (e.g., application, service, component, etc.).

At operation 404, one or more portions of data in the data store may be processed. In aspects, the computing device may have access to a data processing utility that is configured to retrieve/receive data from the data store. The data processing utility may process the retrieved/received data using various techniques. For example, the data processing utility may receive a result set from the data store comprising data related to a particular entity. The result set may be parsed to identify various online identities, content, events, contextual domains (e.g., social media, calendar, movies, contacts, etc.) and/or associated information. The parsed data may be organized (e.g., aggregated and/or sorted) by online identity and/or entity into one or more groups or domain types. The data processing utility may then identify/determine one or more correlations in the organized data. For instance, the data processing utility may analyze the user names and device information for the online identities JohnnyDoe_xx0425xx and JDoe425. The analysis may include the use of a fuzzy logic algorithm to determine similarities between the two user names and a data comparison utility to compare the device information (e.g., name, IP, access dates, etc.) used by each online identity. Based on the analysis, the data processing utility may determine that the two online identities correspond to the entity (e.g., user) John Doe. As a result, the data processing utility may determine a correlation between JohnnyDoe_xx0425xx, JDoe425 and John Doe. As another example, the data processing utility may analyze the content characteristics and interaction characteristics for content tweeted by the online identity Angry_Starbucks_Guy. The analysis may include the use of a machine learning classifier to compare the style, tone and diction of historical and real-time tweets and the access times and GPS coordinates for each user session. The data processing utility may then search the data store for online identities/entities that are associated with content having similar characteristics. In at least one example, the search may include the identification of known and/or suspected associations/associates and content generated by such entities. Based on the analysis, the data processing utility may determine that there is a high degree of similarity between Angry_Starbucks_Guy and the online identity FrappuccinoFanatic. As a result, the data processing utility may determine a correlation between Angry_Starbucks_Guy and FrappuccinoFanatic.

At operation 406, online identities and entities may be mapped. In aspects, the computing device may use a mapping component, such as mapping engine 226, and the correlations determined in operation 304 to create and/or record a mapping between online identities and entities. For example, the data processing utility described with respect to operation 304 may identify a correlation between more than 50 different online identities and the entity (e.g., group) Help Desk. As a result, the mapping component may map each online identity to the Help Desk entity and/or store an indication of the mapping in the data store. In examples, mapping an online identity may comprise generating/storing a key or identifier that identifies an associated entity in a record/data of the online identity.

Figure 5:
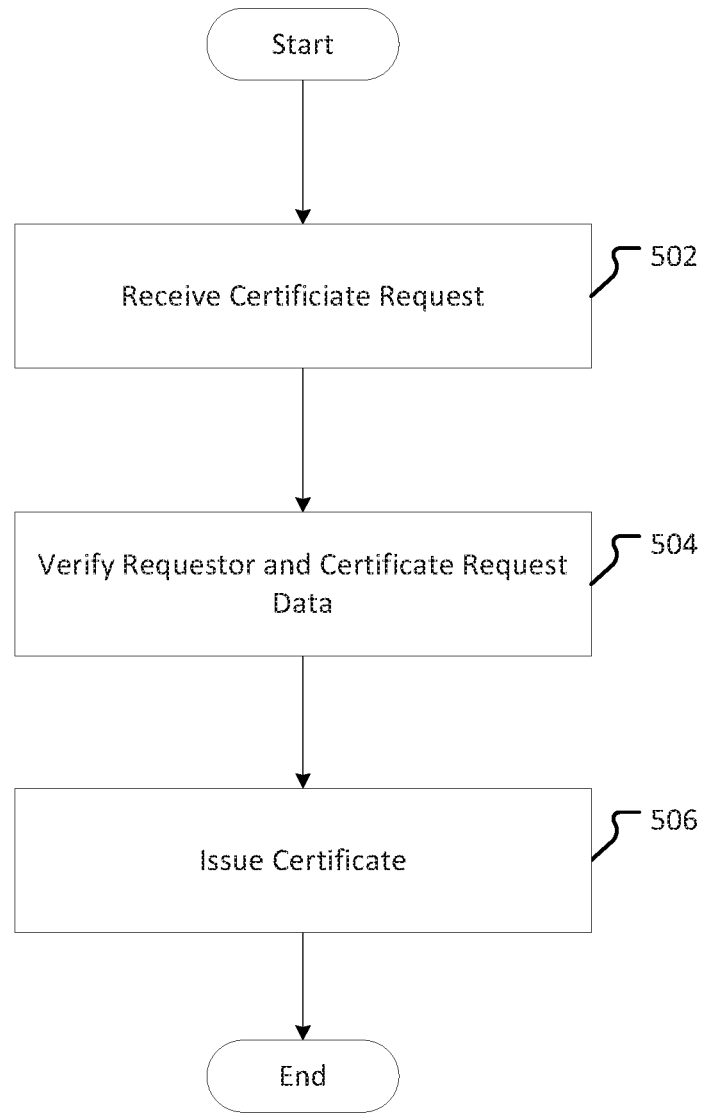
FIG. 5 illustrates an example method for certifying online identities as described herein.

FIG. 5 illustrates an example method of certifying online identities as described herein. Exemplary method 500 begins at operation 502 where a certificate request is received by a certificate system, such as certificate system 228. In aspects, the certificate system may receive certificate requests from online identities/entities attempting to certify themselves as reputable and trustworthy. The certificate requests may be received via an interface or service accessible to a computing device, such as client device 200 and server device 220. The certificate request may comprise identifying information, such as entity data (e.g., name, address, affiliations, photos, etc.), online identity data (e.g., photos, associated entity, etc.), security data (e.g., passwords, cryptographic implements, etc.), device data (e.g., name, IP/MAC address, etc.), content samples, usage data (e.g., proposed dates/times of access, website access list, content generation types, etc.), etc. In some aspects, the certificate system may solicit additional information from a certificate requestor in response to a certificate request. The additional information may include verifications of supplied data, security questions, personal/private keys, expiration data, security policy data, a fee or payment, etc.

At operation 504, a certificate request may be processed. In aspects, the certificate system may analyze the certificate requestor and/or the information within/accompanying the certificate request. Analyzing the certificate requestor may include comparing the requesting online identity/entity to a list of disreputable or untrustworthy online identities/entities, searching one or more data sources for information associated with the requestor, analyzing content generated and/or provided by the requestor, identifying known/suspected affiliates, analyzing content from known/suspected affiliates, etc. Analyzing the information in the certificate request may include evaluating the information against one or more data sources, such as knowledge base 206 and data store 226. For example, a certificate request may comprise an entity name, entity photo, device address and a content sample. The certificate system may compare the entity name to a database of known/suspected fraudulent and untrustworthy actors, such as bots, phishers, hackers, criminals, etc. The certificate system may also compare the entity name to a list (e.g., white list) of approved or trustworthy actors. Image recognition techniques may be used to compare the entity photo to data sources, such as the photo albums, social media images, user profiles, affiliated-entity images, etc. The certificate system may use pattern matching techniques to compare the device address to data sources, such as DNS event logs, authentication event logs, network-device maps, etc. A machine learning mechanism may be used to evaluate the content sample (or the content/interaction characteristics thereof) against a set of labeled data and/or threshold values. For instance, the content characteristics of the content sample may be identified, scored and compared to a set of rules/thresholds for classifying content. In aspects, the certificate system may use the results of these analyses to determine whether the requesting online identity/entity. For example, the certificate system may use a rule set or machine learning mechanism to interpret results from the above analyses and generate a determination concerning the certificate request.

At operation 506, a certificate request may be issued. In aspects, the certificate system may issue a certificate to a certificate requestor based on the determination made in operation 504. A certificate may comprise information about the identity of an entity, a digital signature of an authority that has verified the digital certificate's content, information related to a public/private key, expiration data, etc. In some examples, the certificate system may generate the certificate using one or more portions of the data in the certificate request. In other examples, the certificate system may use an external certificate generation service to generate the certificate. In such an example, the certificate system may provide the certificate generation service with portions of the data in the certificate request. The certificate generation service may then transmit the generated certificate to the certificate system. In some aspects, the certificate system may store a copy of the generated certificate in a location accessible to the computing device. The certificate system may then forward the certificate (or a copy thereof) to the certificate requestor. In examples, the certificate requestor may subsequently use the issued certificate during online interactions to securely validate the identity of the certificate requestor.

Figure 6:
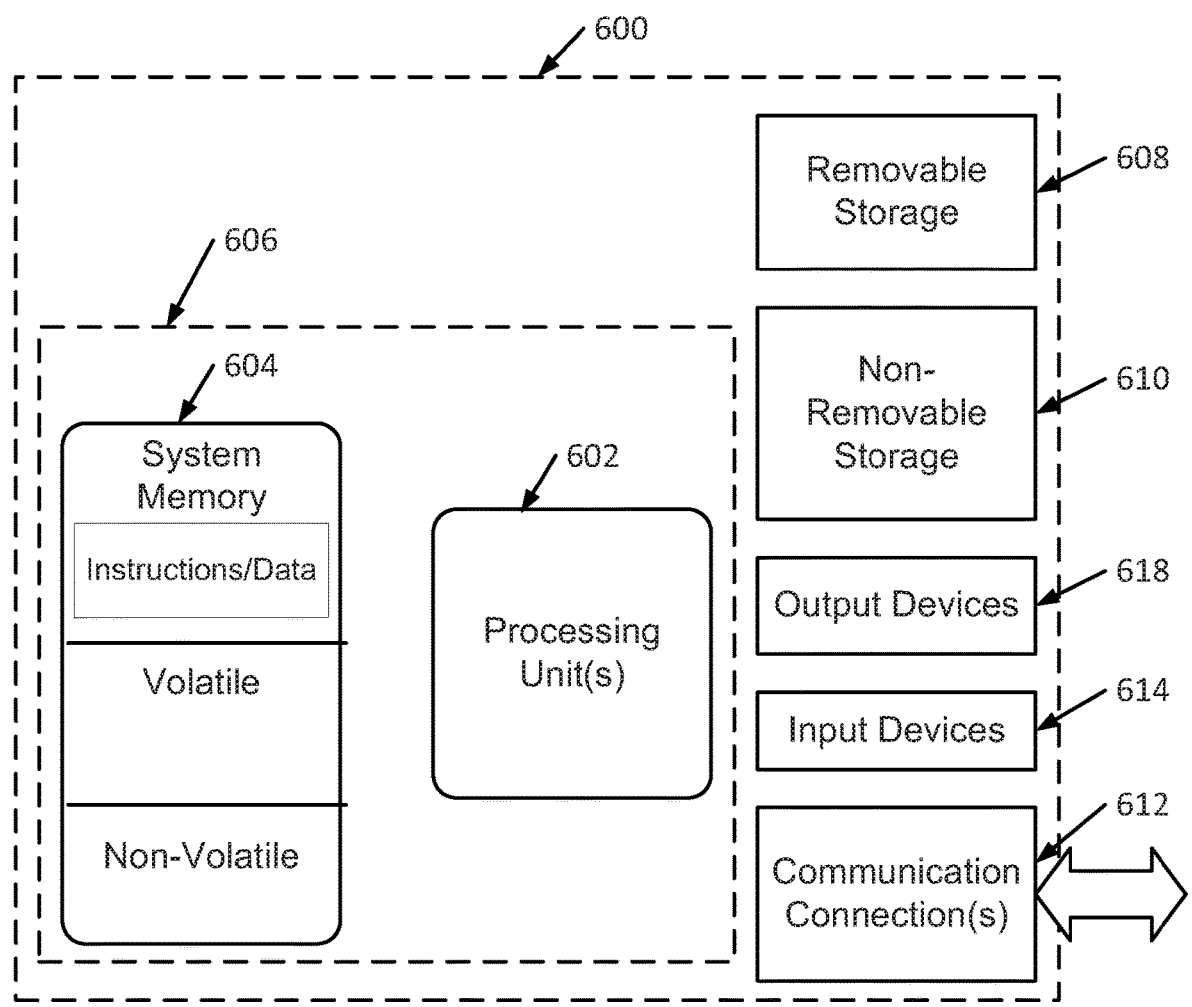
FIG. 6 illustrates one example of a suitable operating environment in which one or more of the present embodiments may be implemented.

FIG. 6 illustrates one example of a suitable operating environment 600 in which one or more of the present embodiments may be implemented. This is only one example of a suitable operating environment and is not intended to suggest any limitation as to the scope of use or functionality. Other well-known computing systems, environments, and/or configurations that may be suitable for use include, but are not limited to, personal computers, server computers, hand-held or laptop devices, multiprocessor systems, microprocessor-based systems, programmable consumer electronics such as smart phones, network PCs, minicomputers, mainframe computers, distributed computing environments that include any of the above systems or devices, and the like.

In its most basic configuration, operating environment 600 typically includes at least one processing unit 602 and memory 604. Depending on the exact configuration and type of computing device, memory 604 (storing, among other things, reputation information, category information, cached entries, instructions to perform the methods disclosed herein, etc.) may be volatile (such as RAM), non-volatile (such as ROM, flash memory, etc.), or some combination of the two. This most basic configuration is illustrated in FIG. 6 by dashed line 606. Further, environment 600 may also include storage devices (removable, 608, and/or non-removable, 610) including, but not limited to, magnetic or optical disks or tape. Similarly, environment 600 may also have input device(s) 614 such as keyboard, mouse, pen, voice input, etc. and/or output device(s) 616 such as a display, speakers, printer, etc. Also included in the environment may be one or more communication connections, 612, such as LAN, WAN, point to point, etc.

Operating environment 600 typically includes at least some form of computer readable media. Computer readable media can be any available media that can be accessed by processing unit 602 or other devices comprising the operating environment. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transitory medium which can be used to store the desired information. Computer storage media does not include communication media.

Communication media embodies computer readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The operating environment 600 may be a single computer operating in a networked environment using logical connections to one or more remote computers. The remote computer may be a personal computer, a server, a router, a network PC, a peer device or other common network node, and typically includes many or all of the elements described above as well as others not so mentioned. The logical connections may include any method supported by available communications media. Such networking environments are commonplace in offices, enterprise-wide computer networks, intranets and the Internet.

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

What is claimed is:

1. A system comprising:
   at least one processor; and
   memory coupled to the at least one processor, the memory comprising computer executable instructions that, when executed by the at least one processor, performs a method comprising:
   accessing a data store, the data store comprising:
     data defining a first online entity;
     online interaction data, the online interaction data comprising content corresponding to content provided during an online interaction by a first online identity with a second online entity;
   processing the online interaction data to identify a correlation between the first online identity and the first online entity as a corresponding entity;
   mapping the first online identity to the corresponding entity based on correlation data, the correlation data comprising the correlation between the first online identity and the corresponding entity, wherein mapping the first online identity comprises storing an identifier that identifies the corresponding entity in a data record of the first online identity; and
   applying a policy to control online access by the corresponding entity to the first online identity based on the mapping of the first online identity to the corresponding entity.

2. The system of claim 1, wherein the data store further comprises at least one of device access data, authentication data, session data, browsing data, online identity profile data, entity profile data and reputation metrics.

3. The system of claim 1, wherein the data store is accessed directly by submitting a query and receiving query results from the data store.

4. The system of claim 1, wherein the data store is accessed indirectly by submitting a search request via a searching utility.

5. The system of claim 1, wherein processing the online interaction data comprises:
   parsing the online interaction data to identify at least one of a user name, an event, and a contextual domain, wherein parsing the online interaction data results in parsed data;
   organizing the parsed data into one or more groups; and
   determining one or more similarities in the one or more groups.

6. The system of claim 5, wherein determining the one or more similarities comprises comparing a first name of the first online identity to a semantically-similar second name of the corresponding entity.

7. The system of claim 5, wherein determining the one or more similarities comprises:
   comparing a first set of device information for the first online identity to a second set of device information for the corresponding entity;
   matching one or more portions of the first and second sets of device information;
   using the matching one or more portions, identifying at least a second online identity; and
   identifying a correlation between the first online identity and second online identity.

8. The system of claim 1, wherein processing the online interaction data further uses a machine learning classifier to analyze the content corresponding to the content provided by the first online identity.

9. The system of claim 8, wherein the machine learning classifier compares a style, tone and diction of interaction content and access times and GPS coordinates for a corresponding user session.

10. A method for mapping a first online identity comprising:
    accessing, by a computing device, a data store, the data store comprising:
      data defining a first online entity;
      online interaction data, the online interaction data comprising interaction data corresponding to data provided during an online interaction by the first online identity with a second online entity;
    processing, by a data processing utility, the online interaction data to identify a correlation between the first online identity and the first online entity as a corresponding entity;

mapping, by a mapping engine, the first online identity to the corresponding entity based on correlation data, the correlation data comprising the correlation between the first online identity and the corresponding entity, wherein mapping the first online identity comprises storing an identifier that identifies the corresponding entity in a data record of the first online identity; and applying a policy to control online access by the corresponding entity to the first online identity based on the mapping of the first online identity to the corresponding entity.

11. The method of claim 10, wherein the data store further comprises at least one of device access data, authentication data, session data, browsing data, online identity profile data, entity profile data and reputation metrics.

12. The method of claim 10, wherein processing the online interaction data comprises:
  parsing the online interaction data to identify at least one of a user name, an event, and a contextual domain, wherein parsing the online interaction data results in parsed data;
  organizing the parsed data into one or more groups; and
  determining one or more similarities in the one or more groups.

13. The method of claim 12, wherein determining the one or more similarities comprises comparing a first name of the first online identity to a semantically-similar second name of the corresponding entity.

14. The method of claim 12, wherein determining the one or more similarities comprises:
  comparing a first set of device information for the first online identity to a second set of device information for the corresponding entity;
  matching one or more portions of the first and second sets of device information;
  using the matching one or more portions of the first and second sets of device information, identifying at least a second online identity; and
  identifying a correlation between the first online identity and the second online identity.

15. The method of claim 10, wherein processing the interaction data further uses a machine learning classifier to analyze interaction content corresponding to content provided by the first online identity.

16. A non-transitory, computer-readable medium storing computer-readable instructions, the computer-readable instructions comprising instructions executable for:
  accessing data defining a first online entity;
  accessing online interaction data, the online interaction data comprising content corresponding to content provided during an online interaction by a first online identity with a second online entity;
  processing the online interaction data to identify a correlation between the first online identity and the first online entity as a corresponding entity;
  mapping the first online identity to the corresponding entity based on correlation data, the correlation data comprising the correlation between the first online identity and the corresponding entity, wherein mapping the first online identity comprises storing an identifier that identifies the corresponding entity in a data record of the first online identity; and
  applying a policy to control online access by the corresponding entity to the first online identity based on the mapping of the first online identity to the corresponding entity.

17. The non-transitory, computer-readable medium of claim 16, wherein processing the online interaction data comprises:
  parsing the online interaction data to identify at least one of a user name, an event, and a contextual domain, wherein parsing the online interaction data results in parsed data;
  organizing the parsed data into one or more groups; and
  determining one or more similarities in the one or more groups.

18. The non-transitory, computer-readable medium of claim 17, wherein determining the one or more similarities comprises comparing a first name of the first online identity to a semantically-similar second name of the corresponding entity.

19. The non-transitory, computer-readable medium of claim 17, wherein determining the one or more similarities comprises:
  comparing a first set of device information for the first online identity to a second set of device information for the corresponding entity;
  matching one or more portions of the first and second sets of device information;
  using the matching one or more portions, identifying at least a second online identity; and
  identifying a correlation between the first online identity and second online identity.

20. The non-transitory, computer-readable medium of claim 16, wherein processing the online interaction data further comprises using a machine learning classifier to analyze the content corresponding to the content provided by the first online identity.

21. The non-transitory, computer-readable medium of claim 20, wherein the machine learning classifier compares a style, tone and diction of interaction content and access times and GPS coordinates for a corresponding user session.

22. The non-transitory, computer-readable medium of claim 16, wherein the online interaction data and the data defining the first online entity are accessed from a data store that further comprises at least one of device access data, authentication data, session data, browsing data, online identity profile data, entity profile data and reputation metrics.

23. The non-transitory, computer-readable medium of claim 16, wherein the online interaction data and the data defining the first online entity are accessed from a data store, and wherein the data store is accessed directly by submitting a query and receiving query results from the data store.

24. The non-transitory, computer-readable medium of claim 16, wherein the online interaction data and the data defining the first online entity are accessed from a data store, and wherein the data store is accessed indirectly by submitting a search request via a searching utility.

* * * * *